(12) United States Patent
Head

(10) Patent No.: US 7,962,379 B2
(45) Date of Patent: Jun. 14, 2011

(54) BUSINESS PROCESS FOR INCREASING WIN PROBABILITY IN LARGE COMPLEX CONTRACT COMPETITIONS

(75) Inventor: Stephany Jean Head, Cabin John, MD (US)

(73) Assignee: Oprisk Associates, LLC, Reston, VA (US)

( * ) Notice: Subject to any disclaimer, the term of this patent is extended or adjusted under 35 U.S.C. 154(b) by 2006 days.

(21) Appl. No.: 10/663,912

(22) Filed: Sep. 17, 2003

(65) Prior Publication Data

US 2004/0254850 A1    Dec. 16, 2004

Related U.S. Application Data

(60) Provisional application No. 60/478,356, filed on Jun. 16, 2003.

(51) Int. Cl.
*G06Q 30/00* (2006.01)
(52) U.S. Cl. .............. 705/27.1; 705/26.4; 705/26.1
(58) Field of Classification Search ............ 705/26–27
See application file for complete search history.

(56) References Cited

U.S. PATENT DOCUMENTS

| | | | |
|---|---|---|---|
| 6,249,768 B1 * | 6/2001 | Tulskie et al. | 705/7 |
| 6,963,854 B1 * | 11/2005 | Boyd et al. | 705/37 |
| 2002/0072957 A1 * | 6/2002 | Thompson et al. | 705/10 |

OTHER PUBLICATIONS

Cressman, Jr, George: "Snatching defeat from the jaws of victory," Marketing Management, Summer 1997, v6i2pg8, Proquest #17011616, 15pgs.*
Porter, Michael; "Competitive Strategy: Techniques for Analyzing Industries and Competitors," The Free Press, 1980; table of contents; 4pgs.*

* cited by examiner

*Primary Examiner* — Robert M. Pond
(74) *Attorney, Agent, or Firm* — Berenato & White, LLC

(57) ABSTRACT

The present invention is directed to a method of increasing win probability of a vendor competing in a complex contract competition. A request is received from a buying organization. The subject vendor calculates a value position of the buying organization, and frames a response to the request based on the calculated value position. The value position is determined by any changes in wealth of the buying-organization. The framed response is then submitted to the buying organization.

18 Claims, 4 Drawing Sheets

BUSINESS PROCESS FOR INCREASING WIN PROBABILITY IN LARGE COMPLEX CONTRACT COMPETITIONS

CROSS-REFERENCE TO RELATED APPLICATION AND CLAIM TO PRIORITY

This application is based on provisional application Ser. No. 60/478,356, filed Jun. 16, 2003, for Stephany Jean Head, the disclosure of which is incorporated herein by reference, and to which priority is claimed.

FIELD OF THE INVENTION

The present invention is directed to a method of increasing win probability of a vendor competing in a complex contract competition. A request is received from a buying organization. The subject vendor calculates a value position of the buying organization, and frames a response to the request based on the calculated value position. The framed response is submitted to the buying organization.

BACKGROUND OF THE INVENTION

Each year organizations acquire goods and services using complex contract awards. Such organizations are referred to herein as "buying-organizations." Complex contracts can be awarded through formal and informal bidding processes, sealed bids, or as sole-source contracts. The organizational decisions involved in awarding complex contracts to a particular vendor involves knowledge transfer of both the vendor's capabilities and the buying-organization's requirements or the particular needs being addressed. The buying-organization typically uses a multi-person decision process, referred to herein as the "decision-makers," through two discrete decision phases, edit and evaluation, to select the final vendor and award the contract.

In many decisions involving complex contracts, it is relatively difficult to define the buying-organization's decision-logic. This is primarily due to the complexity of the contract requirements and cost elements, the various methods in which the vendors differentiate their products and services, and the confidentiality of the decision process. As such, it is sometimes difficult to identify the buying-organization's decision elements used to select the successful vendor.

Buying-organizations do not always select the vendor with the greatest utility. There are a number of contextual issues that arise in the decision process, and at times the buying-organization's decision can appear subjective, preferential, or even political. The contextual issues in the decision process are particularly troublesome due to the vendor's pursuit costs required to successfully win a complex contract. A typical vendor's pursuit costs can range from 1%-5% of the total contract value. For example, a contract valued at $300 million can cost each vendor between $3 million to $15 million in pursuit costs, with a win probability in many instances as low as 30%. In addition, the pursuit can tie up valuable resources from six to eighteen months. With such high pursuit costs, a vendor's decision to pursue a complex contract is considered strategic by the their governing organization; requiring a substantial financial and operational commitment. The vendor's decision to pursue a complex contract is based on their perceived probability of winning, and the availability of slack resources to support the pursuit. The ability to predict the probability of winning loses integrity if there is an incumbent, as well as historical issues with the buying-organization and/or the competition.

Vendors have long recognized the importance of influencing the final award decision after submitting their responses to a particular contract either by influencing the decision-makers, or by impacting one or both of the decision phases. A vendor's ability to increase its win probability in complex contract competition is highly beneficial for a vendor.

SUMMARY OF THE INVENTION

A method of increasing win probability of a vendor competing in a complex contract competition is provided. A vendor receives a request from a buying organization. The vendor calculates a value position of the buying organization, and frames its response to the request based on the calculated value position. The framed response is then submitted to the buying organization.

Calculating a value position of an organization comprises the steps of: assigning a value to a change in wealth factor of an organization; comparing the assigned value to a predetermined value range; assigning a neutral value position to the organization if the assigned value is within the predetermined value range; assigning a positive value position to the organization if the assigned value is greater than the predetermined value range; and assigning a negative value position to the organization if the assigned value is less than the predetermined value range.

The present invention provides for a system for calculating a value position of a buying organization requesting responses to a complex contract, the value position of the vendors competing against each other (competitors) for the same contract, and the value position of the vendor organization pursuing the contract. The system includes a computer having a display, and a computer program executable by the computer. The computer program has a plurality of input fields, and instructions for assigning a value to a plurality of factors entered in each of the plurality of input fields. The assigned values are combined to form a total value. The total value is compared to a predetermined value range. A neutral value position is assigned to the buying organization if the total value is within the predetermined value range. A positive value position is assigned to the buying organization if the total value is greater than the predetermined value range. A negative value position is assigned to the buying organization if the total value is less than the predetermined value range. The assigned value position is displayed on the display.

A system for calculating a value position of a competitor competing with a vendor for a complex contract comprises a computer having a display and a computer program executable by the computer. The computer program has a plurality of input fields, and the computer program has computer instructions for: providing a change of wealth factor corresponding to each one of said plurality of input fields; assigning a value to each change in wealth factor entered in each of said plurality of input fields; combining each of the assigned values to form a total value; comparing the total value to a predetermined value range; assigning a neutral value position to the competitor if the total value is within the predetermined value range; assigning a positive value position to the competitor if the total value is greater than the predetermined value range; assigning a negative value position to the competitor if the total value is less than the predetermined value range; and displaying the assigned value position on the display.

The vendor may also calculate its own value position to identify areas of organizational-inertia. Individuals and/or organizations within the vendor itself that conflict with the value position of the buying-organization may be identified and controlled.

DETAILED DESCRIPTION OF THE INVENTION

Definitions

Figure 1:
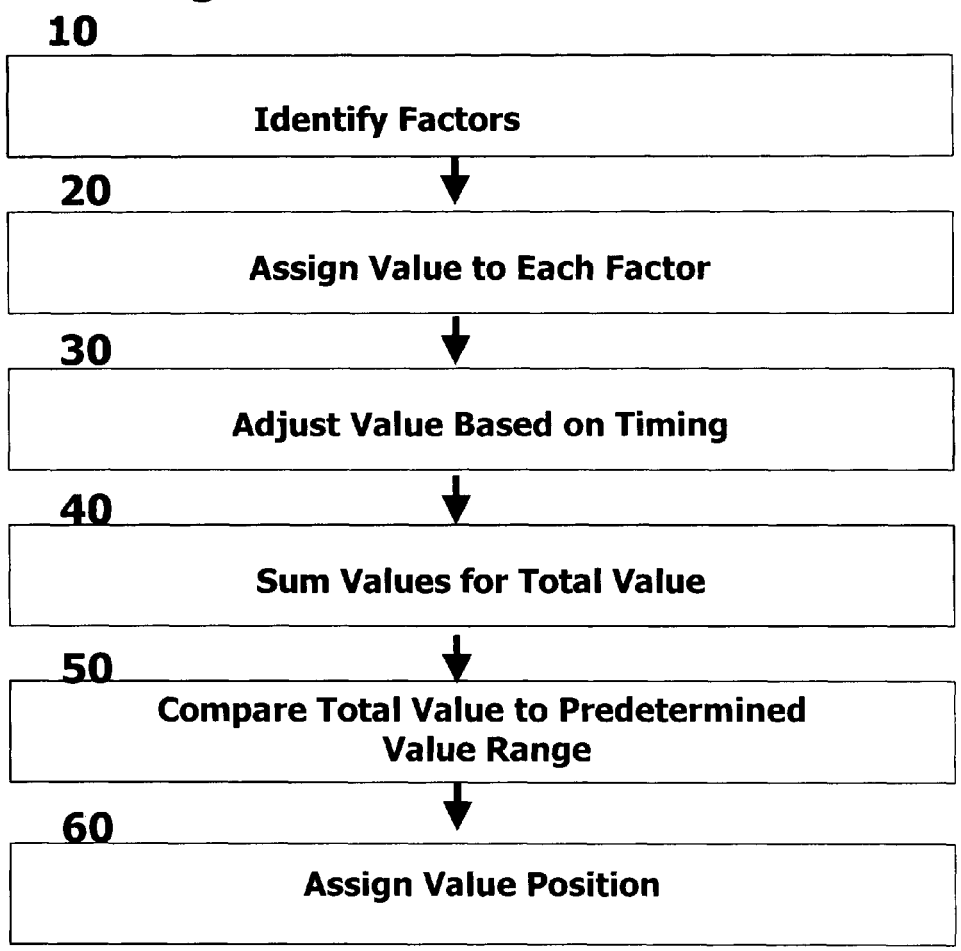
FIG. 1 is a schematic diagram of an algorithm for calculating value position according to the present invention.

Acquisition vehicle means sole source, sealed bid, competitive proposals, and other competitive procedures defined by the buying-organization.

Awarded vendor means the vendor that is chosen by the buying-organization as the "winner" of the complex contract.

Buying-Organization means the organization purchasing the product and services. Depending on the size of the organization, the buying-organization may be a company, an agency, a strategic business unit (SBU), or a line of business.

Buying-organization's requirements are the services and/or products that will be fulfilled by the awarded vendor.

Cancellation effect is when the decision-makers discard components or products shared by multiple vendors competing for the same contract.

Combination effect means reducing the complexity in selecting a vendor for award. The decision-makers combine probabilities or responses that are similar across a multitude of vendors competing for the same contract.

Competitor organization means an organization competing against the vendor organization for the contract award.

Complex contract is a contract containing both goods and services with a contractual period of at least three (3) years, wherein each year is valued at about $30 million dollars or more.

Contract means the vehicle detailing the statement of work, including the legal terms and conditions of the products and services to be purchased by the buying-organization.

Decision-maker is an individual assigned by the buying-organization to participate in the analysis and/or evaluation of the vendor responses, as a participant on the evaluation committee, and a contributor to the buying-organization's vendor decision.

Decision problem means the buying-organization's requirements being considered for competitive bid or sole-source to a vendor. The buying-organization chooses the vendor that will fulfill the contract requirements (i.e. the awarded vendor).

Decision weights means measuring the ability of the vendor to deliver to the Final Choice Set. Decision weights are not probabilities, but rather the result of a multitude of influencers (particularly the Value Position of the buying-organization).

Edit phase is the phase wherein the decision-makers simplify similarities and differences between competing vendors by combining (combination effect), segregating (segregation effect), canceling (cancellation effect), or isolating (isolation effect) vendor information. In the edit phase, the buying-organization formulates the complex contract requirements and frames the decision problem.

Evaluation phase is the phase wherein the buying-organization compares each vendor to the decision problem defined in the edit phase, applies the decision weights, and awards the contract to a particular vendor.

Evaluation committee is the team of decision-makers of the buying-organization.

Final choice set is the initial choice set modified by additional information gathered by the buying-organization. When the vendor options are examined, the initial choice set becomes the final choice set against which the vendor alternatives will be framed as either gains or losses (depending on the buying organization's Value Position).

Formal Request for Proposal (RFP) is the document released by the buying-organization to the vendors that defines the requirements for the products and services under competition.

Framing is the application of the value position to the decision problem. The value position is applied by the decisions-makers to create the "frame", and the frame may be negative, positive, or neutral depending upon the buying-organization's value position. Framing can be applied to the buying organization, the competitor organizations, or the vendor organization.

Incumbent vendor is a vendor providing services and products to the buying-organization during the competition.

Initial choice set is the result of the simplification of the competing vendor characteristics, in which the decision-maker frames each vendor. The initial choice set is a target or desired aspiration the buying-organization sets during the edit phase. Thus, the initial choice set becomes the desired solution for the buying-organization.

Isolation effect means to disregard service or product specifications from competing vendors, and focus on the products or services of one particular vendor, thereby isolating the choice to one vendor. Isolation effect is a means of simplifying a choice between two or more vendors by the decision-makers.

Negative value position means that vendor choices are framed in light of an overall loss, denoting a risk-seeking preference for a loss that is probable over a small loss that is relatively certain.

Neutral value position means that vendor choices are framed in light of an overall gain, denoting a relatively certain smaller gain over a relatively larger gain that is less certain.

Organizational decision problem is a situation which requires a solution, and which can be reduced to a series of vendors for evaluation.

Organizational-inertia is the diminishing probability that a vendor will be awarded a contract during the evaluation phase of the competition when the vendor organization has individuals whose organizational power or authority diminishes if the contract is awarded, or whose value position conflicts with the value position of the buying-organization. A vendor organization having individuals that are affected by organizational-inertia may be unable to effectively embrace the impending change that would result if that vendor organization were awarded the contract. The vendor could not effectively support or initiate activities that would support the desired state for winning the contract. Typically, the closer these individuals from the vendor are to the buying-organization, the more likely the vendor will not be awarded the contract. These individuals and/or vendor organizations are identified when calculating the value position of the vendor organization.

Positive value position means that vendor choices are framed in light of an overall loss, denoting a risk-seeking preference for a loss that is probable over a relatively smaller loss that is relatively certain.

Risk aversion is a preference for a guaranteed outcome over a probable outcome having an equal or greater expected value. Buying organizations with neutral value positions are typically risk averse.

Segregation effect means to disregard service or product specifications that are common to two or more vendors, and focus on the differentiators or services that are unique to each vendor within the set of vendors competing for the contract.

Simplified/Coded responses are the result of the simplification of the vendor characteristics during the edit phase.

Sole source contract is a contract that is awarded without benefit of a formal competition. A sole source contract may be awarded with or without a due diligence process with only one vendor.

Statement of work (SOW) defines the requirements of the buying-organization, and establishes the criteria for the vendor responses.

Subject is an organization, a team of individuals, or an individual of which a value position is being calculated.

Sunk cost effect is the likelihood that the decision-makers will continue a commitment to a decision or a vendor based on a prior relationship or prior experience with that decision or vendor.

Value position is an organization's present context of experience, and can be positive, negative or neutral.

Vendor is a company competing to provide the product or services to the buying-organization.

The Invention

The present invention is directed to a method of increasing the win probability of a vendor competing in large, complex contract competitions. As known in the art, a buying-organization formulates complex contract requirements, and submits the requirements to one or more vendors. The vendors thereafter provide responses to the buying-organization. Decisions-makers of the buying organization typically restructure the vendor responses into simplified choices during an edit phase. The vendor responses may be simplified by combining the probabilities associated with identical outcomes, sometimes referred to as the combination effect. The decision-makers may also disregard components of the responses that are similar between vendors and focus on distinguishing components of the responses, sometimes referred to as the segregation effect. The decision-makers may also focus on the components of one particular vendor, sometimes referred to as the isolation effect. Components of the responses that are shared by the vendors, or that are substantially identical, may be discarded by the decision-makers, sometimes referred to as the cancellation effect. The resulting responses are thereby simplified or coded, and the resulting coded responses define the initial choice set.

The decision-makers of the buying-organization may award the contract to a particular vendor based on the initial choice set. However, additional information may also be gathered, which modifies the initial choice set. The final choice set is the initial choice set modified by any additional information gathered by the buying-organization. The buying organization then measures the ability of each vendor to deliver its obligations under the final choice set through application of decision weights. This phase is sometimes referred to as the evaluation phase.

Thus, the buying organization examines the competing vendors based on the final choice through application of decision weights. The vendor alternatives are framed as either gains or losses. Such an examination is known in the art, and may include a formal framing process, such as a valuation process using negative and positive points. The decision makers may assign a value to each of the vendor responses. The vendor with the highest value is then selected. The highest value depends on the framing of the choice set. It should be understood that other, less formal framing methods may be used by buying organizations. However, most buying organizations will apply some type of framing process wherein vendor alternatives are framed as either gains or losses.

The value assigned to a particular vendor may be either increased or decreased if the decision-makers have evaluated that vendor in other complex contract competitions. If so, the initial choice set is posited to be a function of two factors: 1) the decision makers' prior experience with the vendor; and 2) the similarities between the vendor's prior contract activity and the current contract opportunity.

In addition, as the novelty of the product and services required by the buying-organization increases, the amount of information required to award the contract also increases. Generally, the more information that is required, the more complex the contract. Furthermore, the more information that is required for the evaluation committee to understand the products and services being purchased, the more likely it is that the evaluation committee will require an increased set of decision makers and/or intermediary. Therefore, as the complexity of the contract increases, the more important brand and image of the vendor influence the decision weights.

If none of the vendors meet all the contract requirements, the evaluation committee may adjust their initial choice set. The final choice set is influenced by the evaluation committee's initial choice set and by the decision weights. Typically, vendor information obtained prior to the competitive process will be given a greater weight.

As noted above, the buying-organization may not select the vendor with the greatest utility. Rather, the selection may be influenced by the buying organization's past and present context of experience. This is referred to herein as the buying organization's "value position." The value position of the buying-organization is therefore defined by its recent changes in wealth, which may be either positive or negative changes. Changes in wealth are influenced by business factors, environmental factors, market changes, technology issues, internal issues, governance issues, and information/operational risks.

For example, business factors may include: mergers, acquisitions, and divestment. Environmental factors may include: regulation change and/or deregulation. Market changes may include: substantial rise or fall in demand, prices or margin changes, change in shareholder value, changes in distribution channels, change in revenue streams, change in credit rating or availability, changes in facilities requirements, change in competition, impact of regulations, and global expansion. Technology issues may include: changes in business process requirements, changes in support systems for business requirements, substantial phase-out of applications or hardware, changes in direct or indirect channels (i.e. relatively sudden reliance on Internet sales), techtronic trends such as convergence of technology or business processes, or major shifts in technology. Internal issues may include the ability or inability to sustain continuing operations, default on contracts, missed service level agreements, legal issues such as lawsuits arising from nonperformance of a contract, reduction in force, early retirement offers, changes in personnel, change in structure of SBUs or lines of business, changes in product structure. Governance issues may include Securities and Exchange Commission investigations, disparity in policies or procedures, changes in board of directors or executive organization leadership, and changes in strategic focus. Information/operational risks may arise from espionage and/or security breaches, catastrophic events (i.e. terrorist activities, fraud and/or theft), and intellectual capital losses.

The initial choice set is influenced by the value position. As such, the final choice set is also influenced by the value position. Therefore, determining the value position of the buying organization increases a particular vendor's ability to control and/or predict the initial choice set and thereby manipulate the final choice set. This, in turn, influences the decision weights, and thus increases the ability of a vendor to predict and/or control vendor selection in the contract competition. The vendor that can predict the buying organization's value position, and thus the framing of the initial choice set, is able to predict and control the evaluation phase with a relatively high degree of certainty. For example, implementation of the disclosed method may increase win probability for a vendor competing in a large, complex contract competition up to 50% or more. Typically, the win probability for most vendors is less than 40%, or even less than 20%. Given the cost of complex contract competition for a competing vendor, an increase in win probability increases efficiency and capital savings. For example, a vendor having a historical win probability of 30% may increase its win probability to 45% (i.e. a 50% increase) by implementation of the disclosed invention.

According to the disclosed method, a vendor first calculates the value position of a buying organization prior to submitting its response, as best shown in FIG. 1. The value position is determined by any changes in wealth of the buying-organization. The change in wealth may be determined by specific factors, such as those enumerated above (i.e. business factors, environmental factors, market changes, technology issues, internal issues, governance issues, and information/operational risks). The factors to be considered may vary depending on the particular industry. Therefore, the factors being considered are first identified at 10. Each factor is then assigned a value at 20 by comparing the factor to the particular industry standard.

For example, each factor may be assigned a numerical value based on a defined range, for example a numerical value between 1 and 10. A central reference value, such as 5 in the range of 1-10, indicates neutral behavior in the industry. For example, if the average stock in the paper industry lost 15% of its value, and a buying-organization in the stock industry doubled its value, a numerical value of 8 may be assigned to for this particular factor. It the buying organization also lost 15% of its stock value, a numerical value of 5 would be assigned for this factor. Each numerical value may be adjusted a predetermined amount depending on the time frame in which the factor occurred. Thus, the timing of the factor must be taken into account to determine its impact on the numerical valuation process at 30. For example, an event (i.e. a particular factor) that occurred more than one year ago, will be adjusted so that its impact on the numerical valuation process is not as great as another event (i.e. another factor) that occurred one week ago. Thus, the factor is determined by two dimensions: 1) a specific change in wealth factor; and 2) the timing of the change in wealth factor being considered.

Figure 2:
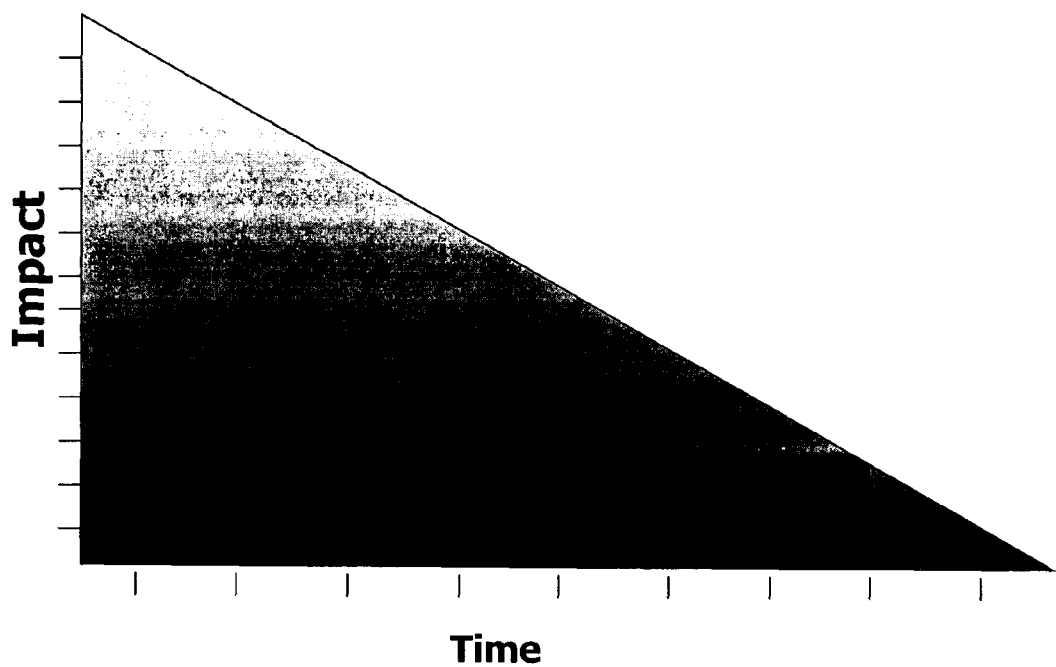
FIG. 2 is a diagram showing the relationship between the timing of an event occurring compared to the impact of that event on value position.

As best shown in FIG. 2, the impact of a particular change in wealth factor diminishes over time. Time is provided on the x-axis, and may represent months. Impact on value position is provided on the y-axis, wherein the valuation of a calculated factor is decreased or increased a predetermined unit or amount depending on the timing of the event. Of course, the unit of value used is arbitrary, so long as it is consistently applied against all identical factors. Generally, changes in wealth that have occurred within the past three months will have the greatest impact on value position calculation. Changes in wealth that have occurred more than one year ago will have a relatively small impact on value position calculation.

After all of the factors being considered have been assigned values, the numerical values are tallied to provide a total value at 40, as best shown in FIG. 1. This total value is then compared to a predetermined value range at 50, and an assigned value position is thereby determined at 60. A total value that falls within a defined central range indicates a neutral value position. A total value that is less than this central range indicates a negative value position. A total value that is greater than this central range indicates a positive value position. The calculated value position is either neutral, positive, or negative.

It should be understood that the assignment of numerical values to each factor may be appropriate for certain applications. However, the invention is not so limited. Any valuation method for each factor may be applied to the present invention, so long as the appropriate factors are considered depending on the industry of the buying organization. Appropriate factors to be considered, industry drivers, and reference values for the particular industry being examined, are known to those skilled in the art.

Regardless of the valuation method that is applied to each factor, the resulting value position will be neutral if there is no substantial change in wealth of the buying organization. The greater the disparity between the absolute value of the calculated total value compared to the central reference range, the more substantial the value position. If the value position is neutral, the initial choice set is framed in terms of gains. If the value position is either positive or negative, the initial choice set is framed in terms of losses.

A negative or positive value position results in an initial choice set that is relatively difficult to obtain, whereas a neutral value position results in an initial choice set that is relatively easy to obtain. An initial choice set that is determined to be relatively easy to obtain will align with a response from a vendor that depicts services and/or products that are considered to be industry standard, and are acceptable solutions to the buying-organization requirements. In such a situation, the buying-organization will seek risk-adverse solutions or industry standard applications of products and/or services to support their requirements. However, an initial choice set that is determined to be relatively difficult to obtain will align with a response from a vendor that depicts services and/or products that are not considered to be industry standard, but rather a risky solution (i.e. aligning with risk-seeking vendors). As such, the location of the initial choice set, and how it is framed (whether neutral, positive or negative), influences the final decision of the buying organization. Once a decision problem has been framed, the decision makers choose their preferred outcome, wherein the preferred outcome corresponds to the final choice set. After the value position of the buying organization has been applied to the initial choice set, a resulting final choice set is evaluated during an evaluation stage.

Figure 3:
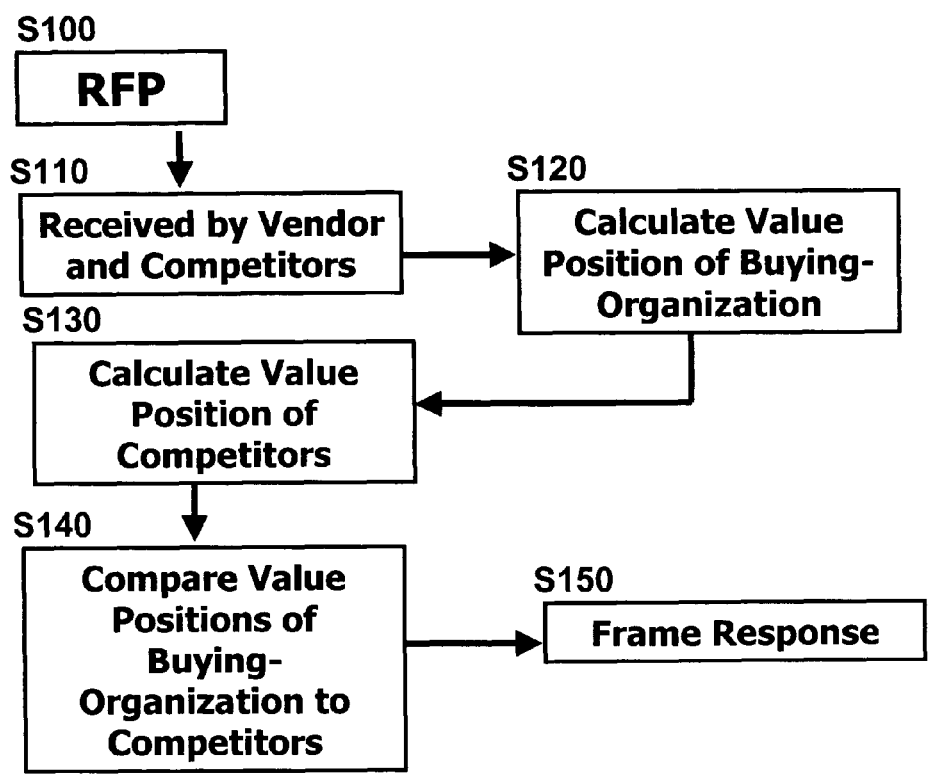
FIG. 3 is a schematic diagram of framing a response for a request for proposals according to the present invention.

The process of the present invention is outlined in FIG. 3. A buying organization issues a request for proposal (RFP) at S100. The RFP is received by a vendor and competitors of that vendor at S110. Prior to acting on the RFP, the vendor first calculates the value position of a buying organization at S120. The value position is calculated as described above, and as set forth in the algorithm shown in FIG. 1. The response will be framed differently depending on whether the value position is neutral, or positive or negative. Thus, the response will be the same if the value position is determined to be either positive or negative.

A comparison of buying organization behavior is set forth in Table 1 below. A buying organization having a negative or positive value position is compared to a buying organization having a neutral value position:

TABLE 1

| Negative or Positive Value Positioned Buying Organization | Neutral Value Positioned Buying Organization |
|---|---|
| In purchase decisions where there is no incumbent, the decision-makers are more likely to set a relatively difficult to attain choice set. | In purchase decisions where there is no incumbent, the decision-makers are more likely to set a relatively easy to attain choice set. |
| In purchase decisions where there is an incumbent, the decision-makers are more likely not to select the incumbent unless the incumbent is perceived as high risk. | In purchase decisions where there is an incumbent, the decision-makers are more likely to select the incumbent unless the incumbent is perceived as high risk. |
| Decision weights are reviewed in terms of gains or losses as opposed to a final value. | Decision weights are reviewed in terms of final value as opposed to gains or losses. |
| Desired choices are framed as a loss with the least probability. | Desired choices are framed in the light of an overall gain. |
| Negative or positive value positioned buying organizations are also more likely to experience the "sunk cost effect", compared to neutral positioned buying organizations. | More likely to change a decision with new information. |

The decision weights are applied to the final choice set during the evaluation stage, which is governed by the value position of the buying organization. As noted above, a negative or positive value positioned buying organization's final award is more likely to support risk-seeking behavior compared to a neutral value positioned buying organization. As such, a neutral value positioned buying organization minimizes risks in its final decision, since it is relatively risk averse. The vendor therefore designs its response in light of this information following its calculation of the buying organization's value position.

In addition to calculating the value position of the buying organization, the value position of any known competitors may also be calculated at S130. The value position of any competitors is also based on any recent changes in wealth of those competitors. Therefore, the same factors and issues enumerated above for calculating the value position of the buying-organization may also be used to calculate competitors' value positions. Determining the value position of known competitors will determine how the competitors will respond to the contract requirements, and whether their response frame is aligned with the frame of the buying organization. For example, a buying organization may have a neutral value position, but the responding competitor may have a positive value position. In that case, it would be likely that the response of the competitor would not be favored by the decisions-makers during the evaluation phase. As such, it would be predicted that the competitor would be eliminated from the contract competition.

The value position of a buying organization is then compared to the value position of competitors at S140. Exemplary outcomes and behaviors based on such a comparison are provided in Table 2:

TABLE 2

| | COMPETITOR | |
|---|---|---|
| | Positive/Negative Value Position | Neutral Value Position |
| BUYING-ORGANIZATION | | |
| Neutral Value Position | Least probable fit between competitor & buying organization Competitor will frame responses in risk-seeking manner Buying-organizations will prefer risk-averse response Competitor will most likely be eliminated Competitor will be defined by buying organizations as too high risk for award | Most probable fit between buying organization and competitor Decisions will be risk-averse for both organizations Both organizations will favor rational processes with well communicated evaluation criteria Difficult competitor to eliminate Most likely of the scenarios to be sole-sourced |
| Positive/Negative Value Position | Both organizations will be risk seeking, creating atmosphere of uncertainty and chaotic decisions Competitor response will be favored by buying organization Award by buying-organization may appear subjective or political | Relatively poor fit between competitor and buying organization Competitor will frame response in risk averse manner Buying-organization will prefer risk-seeking response Competitor may view the buying organization as erratic, chaotic and/or disorganized Competitor may withdraw from competition, deeming buying-organization too high a risk for pursuit investment |

After the value positions have been calculated, the vendor then frames its response to match the value position of the buying organization at S150. The vendor should frame the response so that the editing phase is simplified for the buying organization (i.e. the response should be designed so that similarities and differences between the vendor and its competitors are easily deciphered by the buying organization). Following submission of the framed response, the vendor should ensure that all communication with the buying organization is consistent with the buying organization's desired frame (based on the value position of the buying organization).

The vendor may also calculate its own value position to identify areas of organizational-inertia. During the evaluation phase of the competition, the vendor organization may have pockets of individuals whose organizational power or authority may be diminished if the contract is awarded, or whose value position conflicts with the value position of the buying-organization. The closer these individuals are to the buying-organization, the more likely the vendor will not be awarded the contract. These individuals and/or organizations may be identified when calculating the value position of the vendor.

Alternatively, the vendor may decide not to enter the contract competition depending on the results of the value position calculations for itself and the buying organization.

Figure 4:
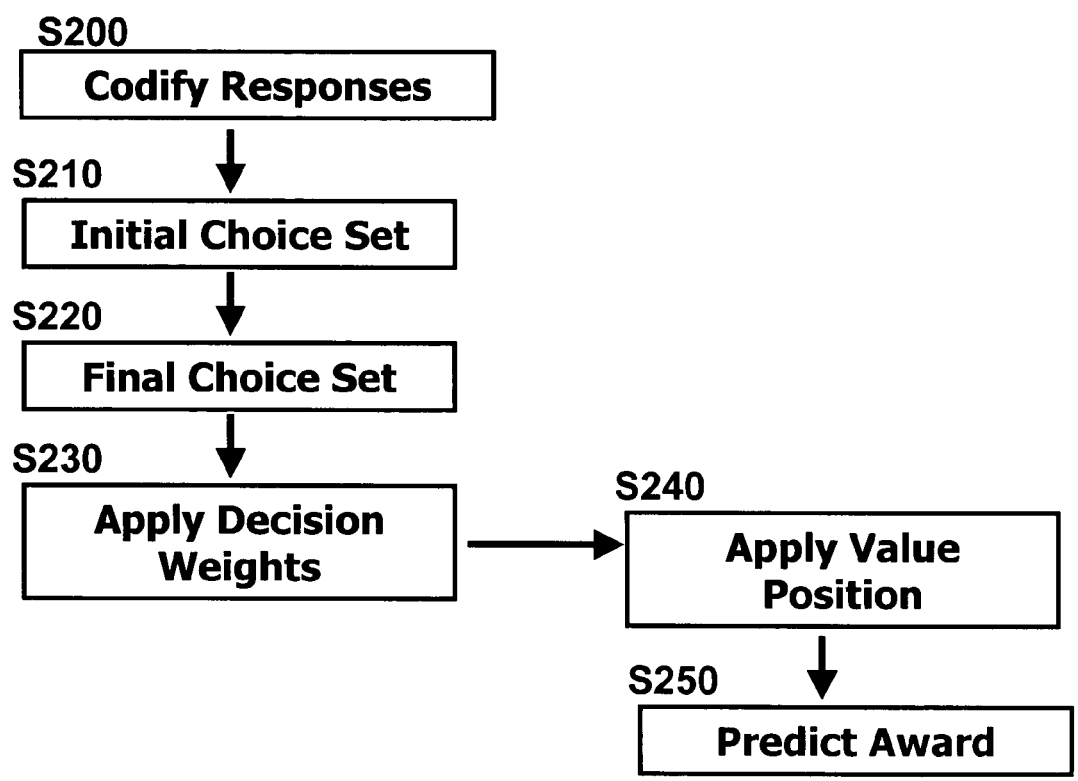
FIG. 4 is a schematic diagram of a complex contract process according to the present invention.

After the competitors have submitted responses to the RFP, and the vendor has submitted its response following a value position calculation, the buying organization simplifies, or codes, the responses at S200, as best shown in FIG. 4. The buying-organization may codify the responses by combination effects, segregation effects, cancellation effects and/or isolation effects. The simplified/codified responses result in an initial choice set at S210. The buying-organization will typically modify the initial choice set by factoring-in any additional information gathered by the buying-organization, resulting in a final choice set at S220. The buying organization then measures the ability of the vendor and each competitor to deliver its obligations under the final choice set by application of decision weights at S230. As noted above, decision weights is the determination of whether each vendor/competitor has the ability to deliver its obligations under the contract. The contract will be awarded to the winning vendor/competitor having a value position that is aligned with the value position of the buying organization, and that has acted in conformity with that value position during the evaluation stage.

Therefore, the vendor can accurately predict how the decision weights will be applied to the final choice set by applying the value position of the buying-organization, competitors and itself, to the decision weights at S240. The vendor may then accurately predict the award outcome for the contract at S250. Furthermore, the vendor substantially increase its chances of winning the contract by acting in conformity with the desired value position of the buying-organization during the evaluation stage. Alternatively, the vendor may decide to drop out of the contract competition if the calculated value positions do not favor its winning the contract.

The vendor may use competitor value positions to predict early eliminations or strong competition. The vendor may also use competitor value positions to develop a competitive strategy for winning the contract competition. After any competitors have submitted responses, the vendor should confirm that such competitors have behaved in accordance with their originally calculated value positions. If they have not, competitor value positions should be recalculated and/or any reasons for the incongruity in calculated value position versus behavior identified.

The vendor may also attempt to influence the decision weights through information transfer to the buying-organization. Such influence may be designed in accordance with the calculated value position of the buying organization. Again, all communication with the buying-organization should be consistent with their desired frame (based upon their value position).

Finally, the vendor may also calculate its own value position to identify areas of organizational-inertia.

The present invention will be more readily understood through reference to the follow example, which is provided by way of illustration, and is not intended to be limiting of the present invention.

EXAMPLE 1

Decision Problem: An international manufacturing company (the "buyer organization") is seeking to reduce costs in their transportation division. They receive proposals from two vendors:

1. Vendor A recommends that the company outsource their transportation to an independent trucking company (Vendor A), thereby eliminating their trucking facilities and staff, but losing control over their ability to support smaller customers in remote locations. Vendor A will guarantee service to large clients encompassing 85% of the company's client-base, but provides no guarantee for the smaller clients.

2. Vendor B recommends that the company eliminate their in-house trucking staff, and using a mixture of shipping contractors and shipping auction markets contract their deliveries on a load-by-load basis. Vendor B will guarantee service to all clients regardless of size, but states that there is an 85% probability that they will meet all deliveries.

The buyer organization must choose either Vendor A or Vendor B.

Edit Phase: The buyer-organization simplifies the proposals (the "responses") to define the initial choice set. The buyer-organization frames each vendor, and assigns an "outcome" (gain or loss) to vendor A and vendor B. The outcome is dependent upon the value position of the buying organization, which is determined by an evaluation committee.

Prior to submitting their responses, the vendors predict the value position of the buying organization. The responses are then positioned based on the value position of the buying organization, which thereby increases their probability of being chosen for award.

A neutral value position, wherein vendor choices are framed in light of overall gain, denoting a relatively sure gain over a larger gain that is only probable, is set forth as follows:
  Vendor A guarantees 100% delivery requirements for large clients.
  Vendor B guarantees 85% probability of meeting delivery requirements for all clients, and 15% probability of missing delivery requirements for all clients.

A positive or negative value position, wherein Vendor choices are framed in light of overall loss, denoting a risk-seeking preference for a loss that is only probable over a smaller loss that is relatively certain, is set forth as follows:
  Vendor A provides no guarantee of delivery requirements for smaller clients.
  Vendor B guarantees 85% probability of not missing any delivery requirements, and 15% probability of not meeting delivery requirements, regardless of client size.

Evaluation Phase: In the evaluation stage, the decision-makers assign a value to each of the "framed" solutions, and choose the framed solution having the highest assigned value. The highest value is dependent on the framing of the choice set.

If the buying organization has a neutral value position, the choice set is framed in terms of the overall gain, denoting the sure gain over a larger gain that is probable. In this example, a buying organization having a neutral value position would select vendor A (i.e. guaranteed delivery for large clients).

If the buying organization has either a positive value position or a negative value position, the choice set is framed in terms of the overall loss, denoting a risk-seeking preference for a loss that is merely probable over a smaller loss that is certain. In this example, a buying organization having a positive or negative value position would select vendor B (i.e. 85% probability of not missing any delivery requirements, and 15% probability of not meeting delivery requirements, regardless of client size).

Certain aspects of the present invention have been explained according to preferred embodiments. However, it will be apparent to one of ordinary skill in the art that various modifications and variations of the disclosed embodiments may be made without departing from the scope or spirit of the invention. Thus, it is intended that the present invention cover all such modifications and variations of the invention, provided they come within the scope of the following claims and their equivalents.

I claim as follows:

1. A computerized method of competing in a complex contract competition, comprising the steps of:
receiving a request from a buying organization;
identifying an industry having industry standards in which the buying organization is defined;
identifying a plurality of change in wealth factors of the buying organization, wherein each of the change in wealth factors has an associated time frame and an industry standard;
entering the industry standards, the change in wealth factors, and the time frames into a calculating program;
calculating a value position of the buying organization by executing the calculating program with an associated computer, wherein said calculating program comprises:
assigning a numerical value to each industry standard;
assigning a numerical value to each of the change in wealth factors of the buying organization by comparing each of the change in wealth factors to the respective industry standard, wherein the assigned change in wealth factor numerical value of the buying organization is equal to the respective industry standard numerical value if the change in wealth factor is neutral relative to the respective industry standard, a numerical value greater than the respective industry standard numerical value is assigned as the change in wealth factor numerical value if the change in wealth factor is positive relative to the respective industry standard, and a numerical value less than the respective industry standard numerical value is assigned as the change in wealth factor numerical value if the change in wealth factor is negative relative to the respective industry standard;
adjusting each of the assigned change in wealth factor numerical values by a predetermined unit depending on the respective time frame associated with the change in wealth factor, wherein the assigned numerical value is increased if the time frame is shorter than an industry standard time frame, and the assigned numerical value is decreased if the time frame is longer than an industry standard time frame;
tallying the industry standard numerical values for each of the identified change in wealth factors to provide a total industry standard value and using this value to create a central value range;
tallying the adjusted, assigned change in wealth factor numerical values to provide a total value;
comparing the total value to the central value range;
assigning a neutral value position to the buying organization if the total value is within the central value range;
assigning a positive value position to the buying organization if the total value is greater than the central value range; and
assigning a negative value position to the buying organization if the total value is less than the central value range;
framing a response of an overall loss to the request based on the calculated value position if the assigned value position is positive or negative;
framing a response of an overall gain to the request based on the calculated value position if the assigned value position is neutral; and submitting the framed response to the buying organization.

2. The method of claim 1, comprising the further steps of:
calculating a value position of a competitor; and
predicting a competitor response to the request based on the calculated value position of the competitor.

3. The method of claim 2, including the further steps of:
comparing the competitor response to the calculated value position of the buying organization; and
predicting an outcome for the competitor.

4. The method of claim 3, including the steps of:
comparing the competitor response to the calculated value position of the competitor; and
adjusting the calculated value position of the competitor so that the competitor response corresponds to its calculated value position.

5. The method of claim 1, comprising the further steps of:
editing at least two responses to form an initial choice set;
applying the calculated value position to the initial choice set to form a final choice set; and
determining an outcome of the final choice set based on the calculated value position of the buying organization.

6. The method of claim 1, comprising the further steps of:
calculating a value position for a vendor;
identifying an area of organizational inertia;
controlling the area of organizational inertia during an evaluation phase of the complex contract competition.

7. A method of calculating a value position of an organization, comprising the steps of:
identifying an industry having industry standards in which the organization is defined;
identifying a plurality of change in wealth factors of the organization, wherein each of the change in wealth factors has an associated time frame and;
entering the change in wealth factors and time frames into a computer program, wherein the computer program:
assigns a numerical value to each of the industry standards;
assigns a numerical value to each of the change in wealth factors of the organization by comparing each change in wealth factor to the respective industry standard, wherein the assigned change in wealth factor numerical value of the buying organization is equal to the respective industry standard numerical value if the change in wealth factor is neutral relative to the respective industry standard, a numerical value greater than the respective industry standard numerical value is assigned as the change in wealth factor numerical value if the change in wealth factor is positive relative to the respective industry standard, and a numerical value less than the respective industry standard numerical value is assigned as the change in wealth factor numerical value if the change in wealth factor is negative relative to the respective industry standard;
adjusts each of the assigned change in wealth factor numerical values by a predetermined unit depending on the respective time frame associated with the change in wealth factor, wherein the assigned change in wealth factor numerical value is increased if the time frame is shorter than an industry standard time frame, and the assigned numerical value is decreased if the time frame longer than an industry standard time frame;
tallies the industry standard numerical values for each of the identified change in wealth factors to provide a total industry standard value, and uses this value to create a central value range;
tallies the adjusted, assigned change in wealth factor numerical values to provide a total value;
compares the total value to the central value range;

assigns a neutral value position to the organization if the total value is within the central value range;

assigns a positive value position to the organization if the total value is greater than the central value range;

assigns a negative value position to the organization if the total value is less than the central value range; and outputs the value position from a computer system executing the computer program.

8. The method of claim 7, wherein the change in wealth factors are selected from the group consisting of a merger, an acquisition, a divestment, a regulation change, a change in market demand, a change in margin, a change in shareholder value, a change in distribution channels, a change in revenue streams, a change in credit rating, a change in facilities requirements, a change in competition, a change in business requirements, a change in support systems, a phase-out of applications, a change in techtronic trends, a default on a contract, a reduction in force, an ERO, a change in personnel, a change in business lines, a change in product structure, a Securities and Exchange Commission investigation, and a security breach.

9. The method of claim 7, including the steps of:
framing a first response of an overall gain if a neutral value position is assigned to the organization; and
framing a second response of an overall loss if one of a positive value position and a negative value position is assigned to the organization.

10. The method of claim 9, wherein the organization is one of a buying organization or a vendor.

11. The method of claim 7, further comprising entering the industry standards into the computer program.

12. A system for calculating a value position of a buying organization requesting responses to a complex contract, the system comprising:
a computer having a display;
a computer program executable by said computer, said computer program having a plurality of input fields, and said computer program having computer instructions for:
receiving an input of a change of wealth factor corresponding to each one of said plurality of input fields, wherein an industry standard and a time frame are attributed to each change in wealth factor;
assigning a numerical value to each industry standard;
assigning a numerical value to each change in wealth factor entered in each of said plurality of input fields by comparing each change in wealth factor to the industry standard, wherein the assigned change in wealth factor numerical value of the buying organization is equal to the respective industry standard numerical value if the change in wealth factor is neutral relative to the respective industry standard, a numerical value greater than the respective industry standard numerical value is assigned as the change in wealth factor numerical value if the change in wealth factor is positive relative to the respective industry standard, and a numerical value less than the respective industry standard numerical value is assigned as the change in wealth factor numerical value if the change in wealth factor is negative relative to the respective industry standard;
adjusting each of the assigned numerical values by a predetermined unit depending on the time frame associated with the change in wealth factor, wherein the assigned change in wealth factor numerical value is increased if the time frame is shorter than an industry standard time frame, and the assigned change in wealth factor numerical value is decreased if the time frame longer than an industry standard time frame;
tallying the industry standard numerical values for each of the change in wealth factors to provide a total industry standard value and using this value to create a central value range;
combining each of the adjusted, assigned change in wealth factor numerical values to form a total value;
comparing the total value to the central value range;
assigning a neutral value position to the competitor if the total value is within the central value range;
assigning a neutral value position to the buying organization if the total value is within the central value range;
assigning a positive value position to the buying organization if the total value is greater than the central value range;
assigning a negative value position to the buying organization if the total value is less than the central value range; and
displaying the assigned value position on the display.

13. The system of claim 12, wherein the computer program has computer instructions for receiving an input of the industry standards.

14. A system for calculating a value position of a competitor competing with a vendor for a complex contract, the system comprising:
a computer having a display;
a computer program executable by said computer, said computer program having a plurality of input fields, and said computer program having computer instructions for:
providing receiving an input of a change of wealth factor corresponding to each one of said plurality of input fields, wherein an industry standard and a time frame is attributed to each change in wealth factor;
assigning a numerical value to each industry standard;
assigning a numerical value to each change in wealth factor entered in each of said plurality of input fields by comparing each change in wealth factor to the industry standard, wherein the assigned change in wealth factor numerical value of the buying organization is equal to the respective industry standard numerical value if the change in wealth factor is neutral relative to the respective industry standard, a numerical value greater than the respective industry standard numerical value is assigned as the change in wealth factor numerical value if the change in wealth factor is positive relative to the respective industry standard, and a numerical value less than the respective industry standard numerical value is assigned as the change in wealth factor numerical value if the change in wealth factor is negative relative to the respective industry standard;
adjusting each of the assigned numerical values by a predetermined unit depending on the time frame associated with the change in wealth factor, wherein the assigned change in wealth factor numerical value is increased if the time frame is shorter than an industry standard time frame, and the assigned change in wealth factor numerical value is decreased if the time frame is longer than an industry standard timeframe;
tallying the industry standard numerical values for each of the change in wealth factors to provide a total industry standard value and using this value to create a central value range;

combining each of the adjusted, assigned change in wealth factor numerical values to form a total value;

comparing the total value to the central value range;

assigning a neutral value position to the competitor if the total value is within the central value range;

assigning a positive value position to the competitor if the total value is greater than the central value range;

assigning a negative value position to the competitor if the total value is less than the central value range; and displaying the assigned value position on the display.

15. The system of claim 14, wherein the computer program has computer instructions for receiving an input of the industry standards.

16. A computer-readable medium on which is encoded computer-executable program code that is executed by a computer to calculate a value position of an organization, the program code comprising:

program code for receiving an input of a plurality of change in wealth factors of the organization from a user, wherein a time frame and an industry standard is attributed to each of the plurality of change in wealth factors;

program code for assigning a numerical value to each of the industry standards;

program code for assigning a numerical value to each of the change in wealth factors of the organization by comparing each of the change in wealth factors to the respective industry standard, wherein the assigned change in wealth factor numerical value of the buying organization is equal to the respective industry standard numerical value if the change in wealth factor is neutral relative to the respective industry standard, a numerical value greater than the industry standard numerical value is assigned as the change in wealth factor numerical value if the change in wealth factor is positive relative to the respective industry standard, and a numerical value less than the respective industry standard numerical value is assigned as the change in wealth factor numerical value if the change in wealth factor is negative relative to the respective industry standard;

program code for adjusting each of the assigned change in wealth factor numerical values by a predetermined unit depending on the time frame associated with the change in wealth factor, wherein the assigned numerical value is increased if the time frame is shorter than an industry standard time frame, and the assigned numerical value is decreased if the time frame is longer than the industry standard time frame;

program code for tallying the industry standard numerical values for each of the identified change in wealth factors to provide a total industry standard value, and using this value to create a central value range;

program code for tallying the adjusted, assigned change in wealth factor numerical values to provide a total value;

program code for comparing the total value to the central value range;

program code for assigning a neutral value position to the organization if the total value is within the central value range;

program code for assigning a positive value position to the organization if the total value is greater than the central value range;

program code for assigning a negative value position to the organization if the total value is less than the central value range; and program code for outputting the value position.

17. The computer-readable medium of claim 16, further comprising:

program code for framing a response of an overall loss to the request based on the calculated value position if the assigned value position is positive or negative;

program code for framing a response of an overall gain to the request based on the calculated value position if the assigned value position is neutral; and program code for submitting the framed response to the buying organization.

18. The system of claim 16, further comprising program code for receiving an input of the industry standards from a user.

* * * * *